(12) United States Patent
Kraemer et al.

(10) Patent No.: US 7,379,169 B1
(45) Date of Patent: May 27, 2008

(54) SYSTEM AND METHOD FOR INTEGRATED MEASUREMENT USING OPTICAL SENSORS

(75) Inventors: Sebastian Gerhard Maxim Kraemer, Bavaria (DE); Bastian Lewke, Bavaria (DE)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 11/608,499

(22) Filed: Dec. 8, 2006

(51) Int. Cl.
*G01N 21/00* (2006.01)
(52) U.S. Cl. .................................. 356/73.1
(58) Field of Classification Search .............. None
See application file for complete search history.

(56) References Cited

U.S. PATENT DOCUMENTS

| 4,539,521 | A | 9/1985 | Matsumoto |
| 5,206,924 | A * | 4/1993 | Kersey ............... 385/24 |
| 6,756,781 | B2 | 6/2004 | Duncan et al. |
| 2003/0095263 | A1* | 5/2003 | Varshneya et al. ......... 356/477 |
| 2006/0045412 | A1* | 3/2006 | Xiao et al. ................. 385/14 |
| 2006/0126252 | A1 | 6/2006 | Mortensen |

FOREIGN PATENT DOCUMENTS

GB     2125960 A     3/1984

OTHER PUBLICATIONS

N.M. Theune, M. Kaufmann, P. Krämmer, M. Willsch, T. Bosselmann; "Applications of Fiber Optical Sensors in Power Generators: Current and Temperature Sensors"; Preprint of Proceedings OPTO 2000 Conference, May 22-25, 2000. (6 Pages).
Byoungho Lee; "Review of the present status of optical fiber sensors"; Optical Fiber Technology 9 (2003) 57-79.
Sebastian Kraemer; "System and Method for Detecting Lightning"; U.S. Appl. No. 11/459,147, filed Jul. 21, 2006; (16 Pages).

* cited by examiner

*Primary Examiner*—Tu T Nguyen
(74) *Attorney, Agent, or Firm*—Ann M. Agosti; Patrick K. Patnode

(57) ABSTRACT

An integrated measurement system for measuring a plurality of parameters is disclosed. The integrated system includes a fiber Bragg grating (FBG) sensor configured for modulating a wavelength of an FBG input signal to provide an FBG output signal corresponding to an FBG parameter, a fiber Faraday rotator (FFR) sensor module configured for rotating a polarization and modulating an intensity of an FFR input signal to provide an FFR output signal corresponding to an FFR parameter, wherein the FBG sensor and FFR sensor module are coupled to provide an integrated system output signal, and a detection system configured for receiving the integrated system output signal and for using the integrated system output signal to obtain values associated with at least one FBG or FFR parameter.

31 Claims, 9 Drawing Sheets

SYSTEM AND METHOD FOR INTEGRATED MEASUREMENT USING OPTICAL SENSORS

BACKGROUND

The invention relates generally to measurement systems and, more particularly, to integrated measurement systems using optical sensors.

Many systems are subjected to effects such as stress and heat, which may be detrimental to the structural integrity of a system. Further, systems such as wind turbines are subjected to lightning hits, which can be detrimental to the wind turbine blade structure. Wind turbines, in particular, are generally subjected to a high risk of lightning strikes as they are preferentially placed at high and windy locations in order to achieve high productivity. For wind turbine blade monitoring, the mechanical stresses are as important as the localization and classification of lightning impacts. Such systems beneficially require the monitoring of current and magnetic field along with stress and temperature.

Currently, to monitor various parameters, individual measurement systems are used to monitor each parameter. Individual monitoring results in separate interrogation, detection, and data acquisition systems, which may give rise to additional cost and space constraints for many systems.

Therefore, there is a need for measurement systems and methods for measuring a plurality of parameters without the aforementioned drawbacks.

BRIEF DESCRIPTION

One embodiment of the present invention is an integrated measurement system for measuring a plurality of parameters. The integrated system includes a fiber Bragg grating (FBG) sensor configured for modulating a wavelength of an FBG input signal to provide an FBG output signal corresponding to an FBG parameter, a fiber Faraday rotator (FFR) sensor module configured for rotating a polarization and modulating an intensity of an FFR input signal to provide an FFR output signal corresponding to an FFR parameter, wherein the FBG sensor and FFR sensor module are coupled to provide an integrated system output signal, and a detection system configured for receiving the integrated system output signal and for using the integrated system output signal to obtain values associated with at least one FBG or FFR parameter.

Another embodiment of the present invention is a system including a substrate, and an integrated measurement system. The integrated measurement system includes at least one integrated sensor module operably coupled to the substrate to measure a plurality of parameters, wherein the sensor module includes at least one FBG sensor and at least one FFR sensor module, wherein the plurality of parameters include at least one FBG parameter sensed by the at least one FBG sensor and at least one parameter sensed by the FFR sensor module, wherein the integrated measurement system generates an integrated system output signal corresponding to both at least the one FBG parameter and the at least one FFR parameter.

Another embodiment of the present invention is a wind turbine system. The wind turbine system includes a wind turbine comprising one or more turbine blades, and an integrated measurement system comprising one or more integrated sensor module operably coupled to the one or more turbine blades to measure a plurality of parameters, wherein the integrated sensor module comprises at least one FBG sensor and at least one FFR sensor module module, wherein the plurality of parameters comprise at least one FBG parameter sensed by the at least one FBG sensor and at least one FFR parameter sensed by the FFR sensor module module, wherein the integrated measurement system generates an integrated system output signal corresponding to at least the one FBG parameter and the at least one FFR parameter.

Still another embodiment of the present invention is a method for integrated measurement of a plurality of parameters. The method includes interrogating at least one integrated sensor module using an interrogation signal, wherein the integrated sensor module comprises at least one FBG sensor for sensing at least FBG parameter and at least one FFR sensor module for sensing at least one FFR parameter, wherein the FBG sensor is interrogated using an FBG input signal and the FFR sensor module is interrogated using an FFR input signal, generating an integrated system output signal associated with both the FBG parameter and FFR parameter, detecting the integrated system output signal to generate a FBG parameter data and FFR parameter data, and determining a value of the FBG parameter and the FFR parameter.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
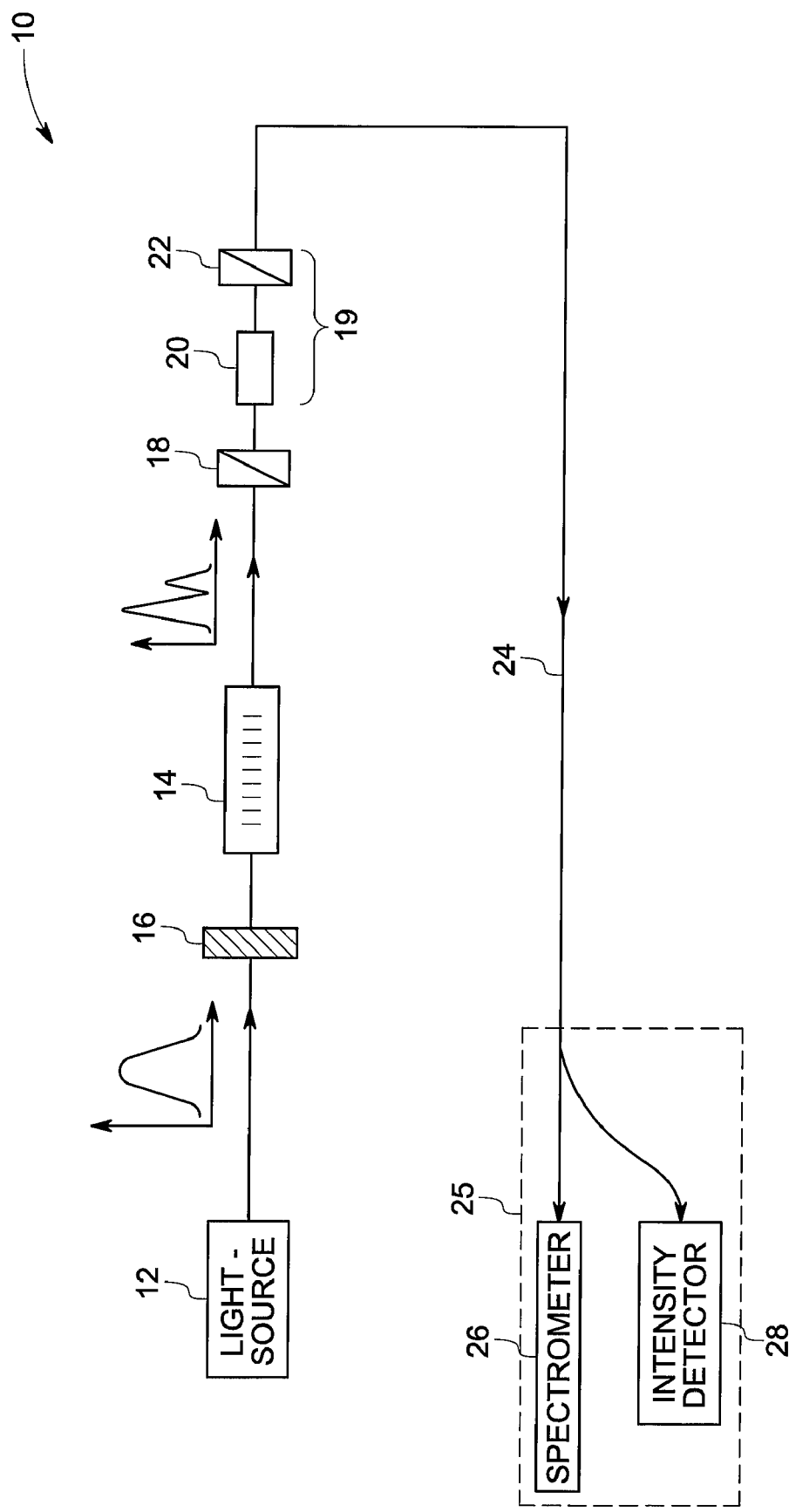
FIG. 1 is a schematic representation of an integrated measurement system in one embodiment of the present invention.

Embodiments of the present invention include systems and methods for integrated measurement of a plurality of parameters using a coupled fiber Bragg grating (FBG) sensor (meaning at least one FBG sensor) and a fiber Faraday rotator (FFR) sensor module (meaning at least one FFR sensor module).

In the following specification and the claims which follow, reference will be made to a number of terms which shall be defined to have the following meanings. The singular forms "a", "an" and "the" include plural referents unless the context clearly dictates otherwise.

As used herein, the term "integrated measurement of a plurality of parameters" refers to a configuration wherein an integrated system output signal, encoding parameter information sensed by both an FBG sensor and an FFR sensor module, is generated, detected and analyzed to determine at least one FBG or FFR parameter. In one embodiment the integrated system output signal, encoding parameter information sensed by both an FBG sensor and an FFR sensor module, is generated, detected and analyzed to determine both an FBG parameter and an FFR parameter. The term "integrated system output signal" refers to a signal encoding both the parameter values sensed by an FBG sensor and an FFR sensor module individually.

A fiber Bragg grating (FBG) is usually formed by periodic modulation of the refractive index of an optical fiber's core. An FBG is highly reflective to light having wavelengths within a narrow bandwidth that is centered at a wavelength that is referred to as the Bragg wavelength ($\lambda_B$), while other wavelengths are passed without reflection. The Bragg wavelength is dependent on physical parameters such as stress and temperature that impact the refractive index, which consequently leads to a change in the grating period. In one embodiment, a FBG sensor can consist of several sensitive grating elements that might be distributed over the fiber.

The fiber Faraday rotator (FFR) works on the principle of the Faraday effect, wherein a plane of polarization of a linearly polarized light propagating in a material that exhibits magneto optic effect undergoes a rotation through an angle under the influence of an external magnetic field. The angle of rotation is proportional to a component of the magnetic field parallel to the direction of propagation of the light.

An induced magnetic field can be measured directly from the rotation of the plane of polarization of an input FFR signal, also referred to as Faraday rotation given by equation 1:

$$\Theta(\lambda,T) = V(\lambda,T) \int H dl \quad (1)$$

wherein $\Theta$ denotes the angle of Faraday rotation, $\lambda$ denotes the wavelength of light, T is the temperature, V is the Verdet constant of the fiber optic crystal, and H is the magnetic field intensity along a propagation path l. The term "Verdet constant" of a material referred herein is defined as an optical constant that is a measure of strength of the Faraday effect for a respective material. Sensitivity of measurements increases with increase in the Verdet constant.

If a fiber coil is used to sense a magnetic field created by a conductor the coil is wrapped around, then the Faraday rotation angle is given by equation 2:

$$\Theta = VNI \quad (2)$$

where V is the Verdet constant, N is the number of turns in the fiber optic coil and I is the current in the conductor.

One embodiment of the present invention is an integrated measurement system for measuring an FBG parameter (meaning at least one FBG parameter) sensed by the FBG sensor and an FFR parameter (meaning at least one FFR parameter) sensed by the FFR sensor module. The FFR sensor module includes an FFR and a polarizer. The FBG wavelength modulates an input FBG signal based on the sensed FBG parameter and the FFR sensor module rotates the polarization using the FFR and intensity modulates using the polarizer, an input FFR signal based on the sensed FFR parameter.

In one embodiment, a modulated signal generated by one of the FBG sensor or the FFR sensor module is used to interrogate the other. In one example, an interrogation signal generated by a light source forms the FBG input signal and at least a part of the FBG output signal forms the FFR input signal. The FFR output signal then forms the integrated system output signal. Conversely, in an alternate example, an interrogation signal generated by a light source may form the FFR input signal with at least a part of the FBG output signal forming the FFR input signal. The FFR output signal may then form the integrated system output signal.

Non-limiting examples of an FBG parameter include temperature and stress. In one embodiment, the FBG sensor is coupled to or in contact with a substrate or part of a system such as a blade of a wind turbine system, whose temperature or stress is to be measured.

Non-limiting examples of an FFR parameter include current and magnetic field. While magnetic field may be measured directly by disposing the FFR sensor module in the magnetic field, current is measured indirectly by disposing the current carrying conductor, which generates a magnetic field adjacent to the FFR sensor module. A current carrying conductor develops a magnetic field around it, which is sensed by the FFR sensor module. In one example, the FFR includes a fiber optic crystal or an optical fiber coil. In a non-limiting example, the crystal may comprise an optically transparent ferromagnetic crystalline material with a high Verdet constant such as yttrium-iron-garnet and gadolinium-iron garnet. In a fiber optic coil configuration, an optical fiber coil is wound around a current carrying conductor to sense the magnetic field due to the current in the conductor. The rotation of the plane of polarization is proportional to the Verdet constant, the number of turns in the optical fiber coil and the current through the conductor as shown in equation 2. In order to achieve a desirable signal to noise ratio in an output signal, a number of turns in the coil may be needed. In one embodiment, the FFR is used to detect and measure a current due to a lightning strike on a system, which is conducted to the measurement system using a conductor. The FFR is placed in the magnetic field generated by the current flowing in the conductor.

In one embodiment, the FFR parameter is a lightning parameter, which includes not only a current generated by a lightning strike but also includes a position measurement of a lightning strike. In one embodiment a plurality of FFR modules displaced with respect to each other on a substrate subjected to a lightning strike may be used to localize the position of lightning strike.

In one embodiment, the measurement system further includes an interrogation module including one or more light sources. In one embodiment, the light source is multi-frequency. As used herein, the term "multi-frequency light source" refers to an source emitting light at a plurality of wavelengths such as but not limited to a broadband optical source, a Fabry-Perot laser, an external cavity laser, or an optical device including a plurality of light sources emitting at a plurality of wavelengths.

In a further embodiment, the measurement system includes a spectrometer or a spectrum analyzer to extract the wavelength modulation information from at least a part of the integrated system output signal.

In one embodiment, a polarizing analyzer, which is a polarizer, is used to convert the polarization-rotated signal emerging from the FFR to an intensity-modulated signal.

The polarizing analyzer has a fixed angle of polarization with respect to the plane of polarization of the interrogation signal coupled into the FFR. As the polarization plane of the polarization rotated signal emerging from the FFR changes depending upon the value of the sensed magnetic field, the magnitude of component of the polarization rotated signal along the polarization angle of the polarizing analyzer changes, thereby converting the encoding from a polarization rotation angle to an intensity modulation.

In one embodiment, an intensity detector such as a photodiode is used to measure the intensity of at least a part of the integrated system output signal.

In one embodiment, the measurement system includes a data processing and control unit for processing the information generated by the spectrometer and/or the detector to determine values of the FFR parameter sensed. In a further embodiment, the data processing and control unit is also used to control the light source and the spectrometer and the detector.

FIG. 1 illustrates a measurement system 10 in one embodiment of the present invention. The system 10 includes a light source 12, light from which is coupled into an FBG sensor 14 including a fiber Bragg grating or a fiber Bragg grating array. The light from the light source 12 (FBG input signal, in this embodiment) is used to interrogate the FBG sensor 14. In one example, the light source is a broadband light source. In the embodiment shown in FIG. 1, the wavelength modulated signal from the FBG sensor is obtained in the transmissive mode. The wavelength modulation is indicative of a sensed FBG parameter such as temperature or strain, which modifies the Bragg wavelength of the FBG.

The light from the source 12 is optionally depolarized using a depolarizer 16 before the light is coupled into the FBG sensor 14. Typically, the spectral response of an FBG and the intensity response of the FFR depend on the polarization of the incident light. If the incident light is highly polarized, this polarization dependence can cause errors in both responses. In many systems, using single mode fibers (SMF), the polarization of the incident light is varying and unknown and leads to unpredictably varying shifts in the wavelength of the spectral and intensity responses. A depolarizer may be used to mitigate this effect.

A wavelength modulated (WM) signal emerges from the FBG sensor 14 and is incident on a first polarizer 18 before being coupled into the FFR sensor module 19. The first polarizer 18 linearly polarizes the wavelength-modulated (WM) signal to provide an FFR input signal. The FFR sensor module 19 includes an FFR 20 and a polarizing analyzer 22. Depending upon the component of magnetic field sensed along the direction of propagation of light, the plane of the linearly polarized wavelength modulated signal is rotated. The polarization rotated (PR) signal is further incident on the polarizing analyzer, which converts the rotation angle information to variation in intensity to provide an intensity modulated wavelength modulated (IMWM) signal which forms the integrated system output signal. The polarizing analyzer 22 has a fixed angle of polarization with respect to the first polarizer 18. This integrated system output signal is carried along a fiber 24 to a detection system 25. In embodiments of the present invention, a detection system can include one or more spectrometers or one or more intensity detectors or both. In the illustrated embodiment shown in FIG. 1, the integrated system output signal is partly coupled into a spectrometer 26 and partly coupled into an intensity detector 28. The spectrometer characterizes the wavelength shift/change due to the FBG parameter, and the intensity detector characterizes the intensity change due to the FFR parameter. In this embodiment, the integrated system output signal is used to determine both the FBG parameter and the FFR parameter. In one embodiment, the use of optical fibers to transmit the signals between sensors and the use of fiber sensors reduces the effect of electromagnetic interference (EMI) on the measurement.

In one embodiment, an interrogation or sampling rate of the sensors is greater than about 500 kHz. In a further embodiment, an interrogation or sampling rate of the sensors is greater than about 1 MHz. In a further embodiment, an interrogation or sampling rate of the sensors is greater than about 2 MHz.

Figure 2:
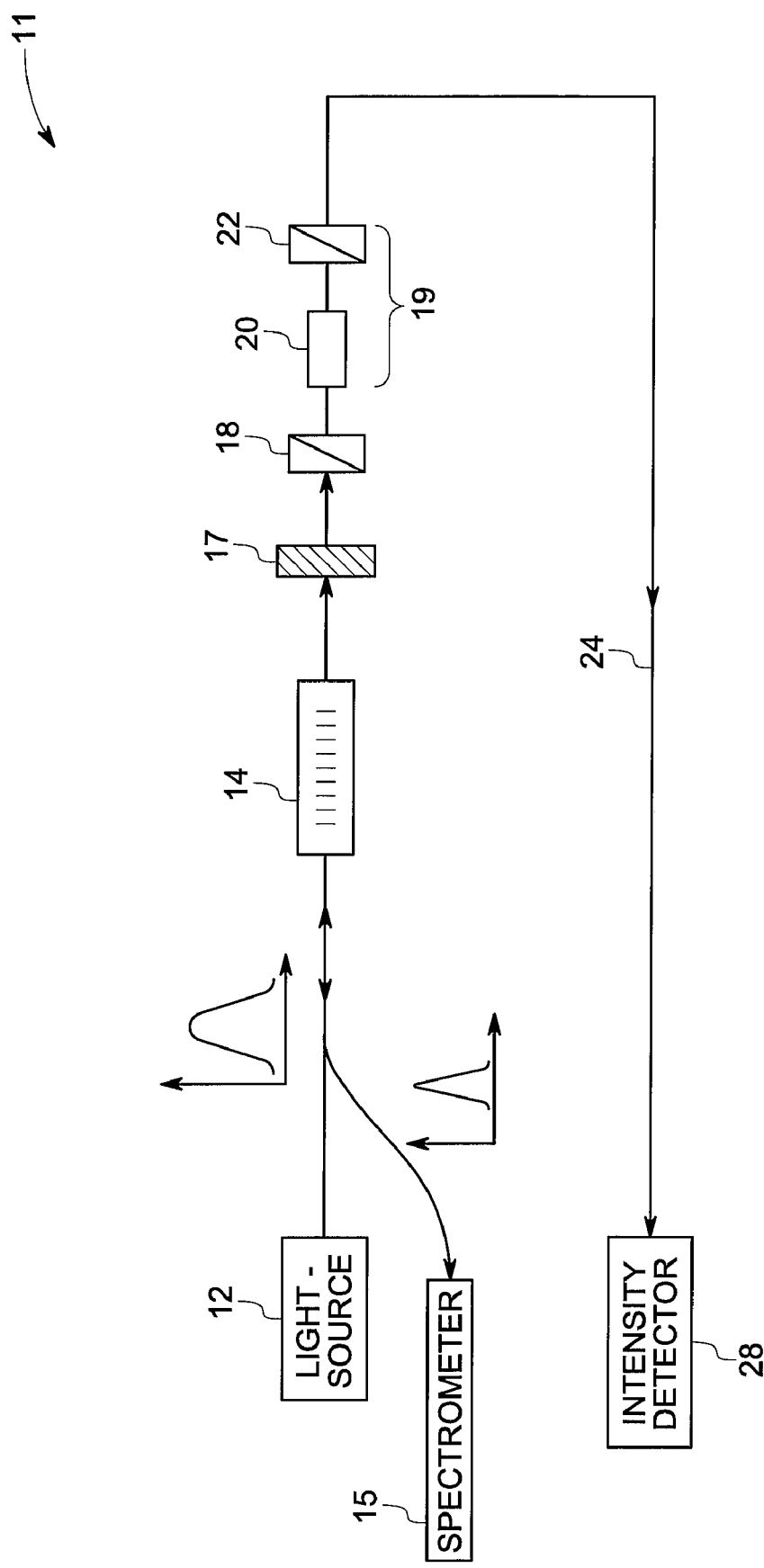
FIG. 2 is a schematic representation of an integrated measurement system in another embodiment of the present invention.

An alternate embodiment to the embodiment illustrated in FIG. 1, is shown in FIG. 2. This embodiment, although having a similar set-up to the embodiment in FIG. 1, also includes the detection of the FBG output signal in the reflective mode. The system 11 includes a light source 12, light from which is coupled into an FBG sensor 14 including a fiber Bragg grating or a fiber Bragg grating array. The light from the light source 12 (FBG input signal, in this embodiment) is used to interrogate the FBG sensor 14. In this embodiment, both the wavelength modulated reflected FBG output signal and the wavelength modulated transmitted FBG output signal are used.

While the reflected FBG signal is detected by a spectrometer 15, the transmitted FBG output signal is incident on a depolarizer 17. An advantage in this embodiment is that the reflected FBG signal, which is sent to the spectrometer without passing through the FFR sensor and hence without the FFR affecting the intensity of the FBG signal, can be used to determine an FBG parameter. The depolarized light emerging from the depolarizer 17 is incident on the first polarizer 18, which linearly polarizes the wavelength-modulated (WM) signal to provide an FFR input signal. The FFR sensor module 19 includes an FFR 20 and a polarizing analyzer 22. The FFR parameter is encoded as an intensity variation/modulation in the output signal from the FFR. This output signal is carried along fiber 24, before being detected by an intensity detector 28. In this embodiment, the integrated system output signal is used to determine the FFR parameter, while the reflected FBG output signal is used to determine the FBG parameter.

Figure 3:
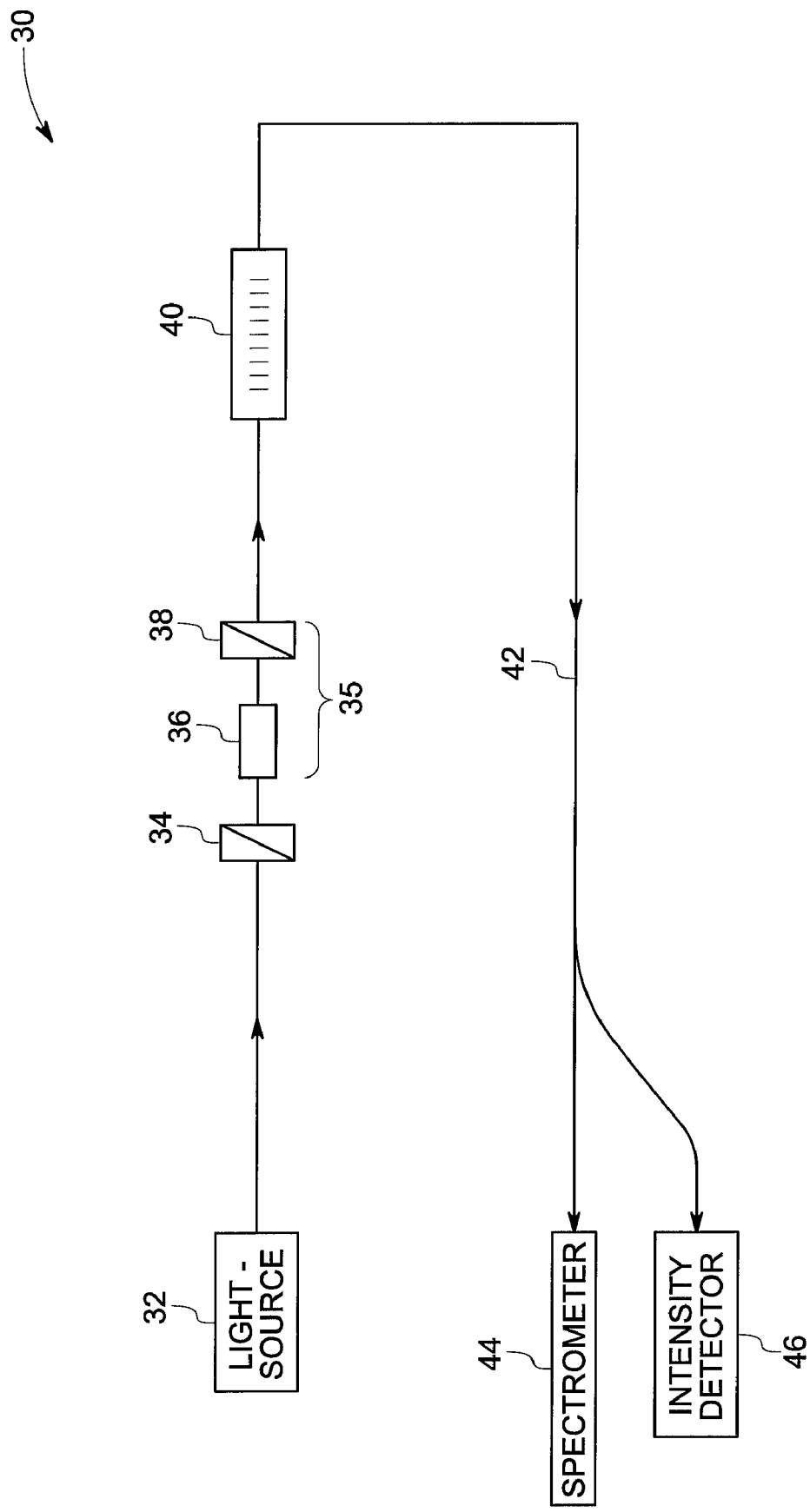
FIG. 3 is a schematic representation of an integrated measurement system in another embodiment of the present invention.

FIG. 3 illustrates a measurement system 30 in one embodiment of the present invention. The system 30 includes a light source 32, light (interrogation signal) from which is coupled into a polarizer 34 to linearly polarize the light before being incident on an FFR sensor module 35 as the FFR input signal. The FFR 36 rotates the polarization plane of the FFR input signal corresponding to a sensed FFR parameter to provide a polarization rotated signal, which is converted to an intensity modulated (IM) signal by polarizer 38. The IM signal is incident on an FBG sensor 40 as the FBG input signal. In contrast to the embodiment illustrated in FIG. 1, in this embodiment, a depolarizer is typically not used before the FBG sensor 40. The FBG sensor 40, wavelength modulates the incident IM signal corresponding to a sensed FBG parameter to provide an IMWM signal (integrated system output signal), which is carried along a fiber 42 before being partly coupled into a spectrometer 44 and partly into an intensity detector 46.

Figure 4:
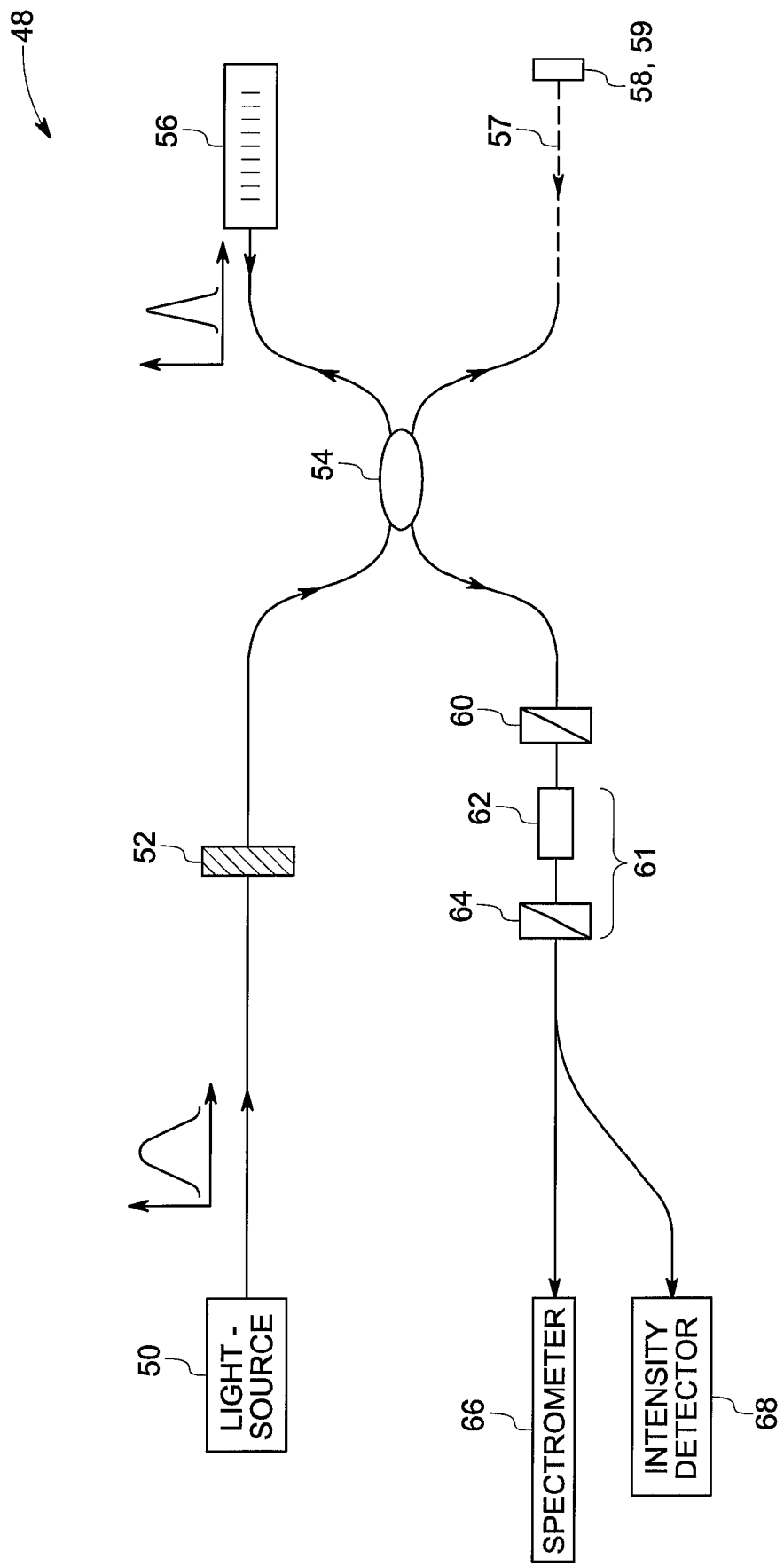
FIG. 4 is a schematic representation of an integrated measurement system in another embodiment of the present invention.

FIG. 4 illustrates a measurement system 48 in still another embodiment of the present invention. In this embodiment, the FBG sensor is used in a reflective mode. The system 48 includes a broadband light source 50. An interrogation signal from the light source is coupled into a depolarizer 52 to depolarize the light before being coupled into a coupler 54. The coupler splits the incident depolarized light and partly couples it through a fiber into an FBG sensor 56 and partly through another fiber to reflect off a mirror 58. The FBG sensor 56 reflects back, along fiber 57 towards the coupler 54, a wavelength modulated signal corresponding to a sensed FBG parameter centered about the Bragg wavelength, which is superimposed over the reflected signal from the mirror at the coupler and is coupled out of the coupler and transmitted to a first polarizer 60, which polarizes the signal, which is then incident on the FFR sensor module 61. The FFR sensor module 61 includes an FFR 62, which rotates the polarization plane of the incident signal corresponding to a sensed magnetic field and further includes a second polarizer 64, which intensity modulates the signal to provide an IMWM signal, which is carried through to the spectrometer 66 and detector 68 as the integrated system output signal.

Alternatively, instead of the mirror 58, an absorber 59 may be used. In this configuration, only the WM signal from the FBG sensor 56 is coupled into the FFR sensor module 60.

Figure 5:
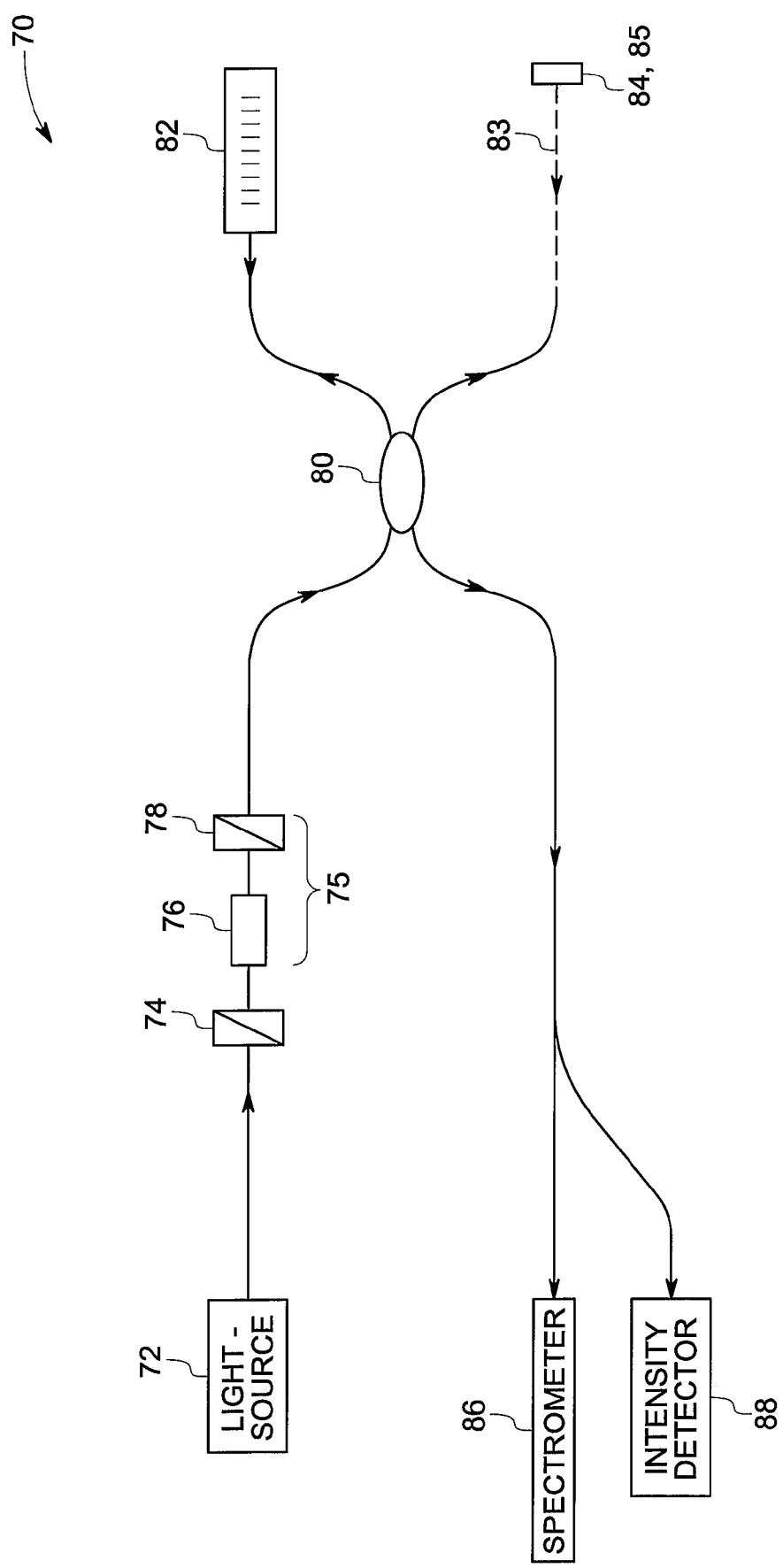
FIG. 5 is a schematic representation of an integrated measurement system in another embodiment of the present invention.

FIG. 5 illustrates a measurement system 70 in one embodiment of the present invention. In this embodiment, the FBG sensor is used in the reflective mode. The system 70 includes a broadband light source 72 emitting an interrogation signal which is coupled into a first polarizer 74 to linearly polarize the interrogation signal before being incident on the FFR sensor module 75 including an FFR 76 and a second polarizer 78. A polarization rotated (PR) signal emerges from FFR and is incident on a second polarizer 78. The incident PR signal emerges as an intensity modulated (IM) signal from the second polarizer 78 and through a coupler 80 eventually probes an FBG sensor 82. The IMWM signal reflected by the FBG sensor 82 is characteristic of both the magnetic field sensed by the FFR sensor module 76 and the parameter sensed by the FBG sensor 82. Part of the IM signal is also coupled towards a mirror 84, which reflects it back towards the coupler 80 and is superimposed over the IMWM signal at the coupler 80 to form an integrated system output signal, which is sent to the spectrometer 86 and the intensity detector 88.

Alternatively, instead of the mirror 84, an absorber 85 may be used. In this configuration, only the reflected signal from the FBG sensor 82 is sent to the spectrometer 86 and detector 88.

Figure 6:
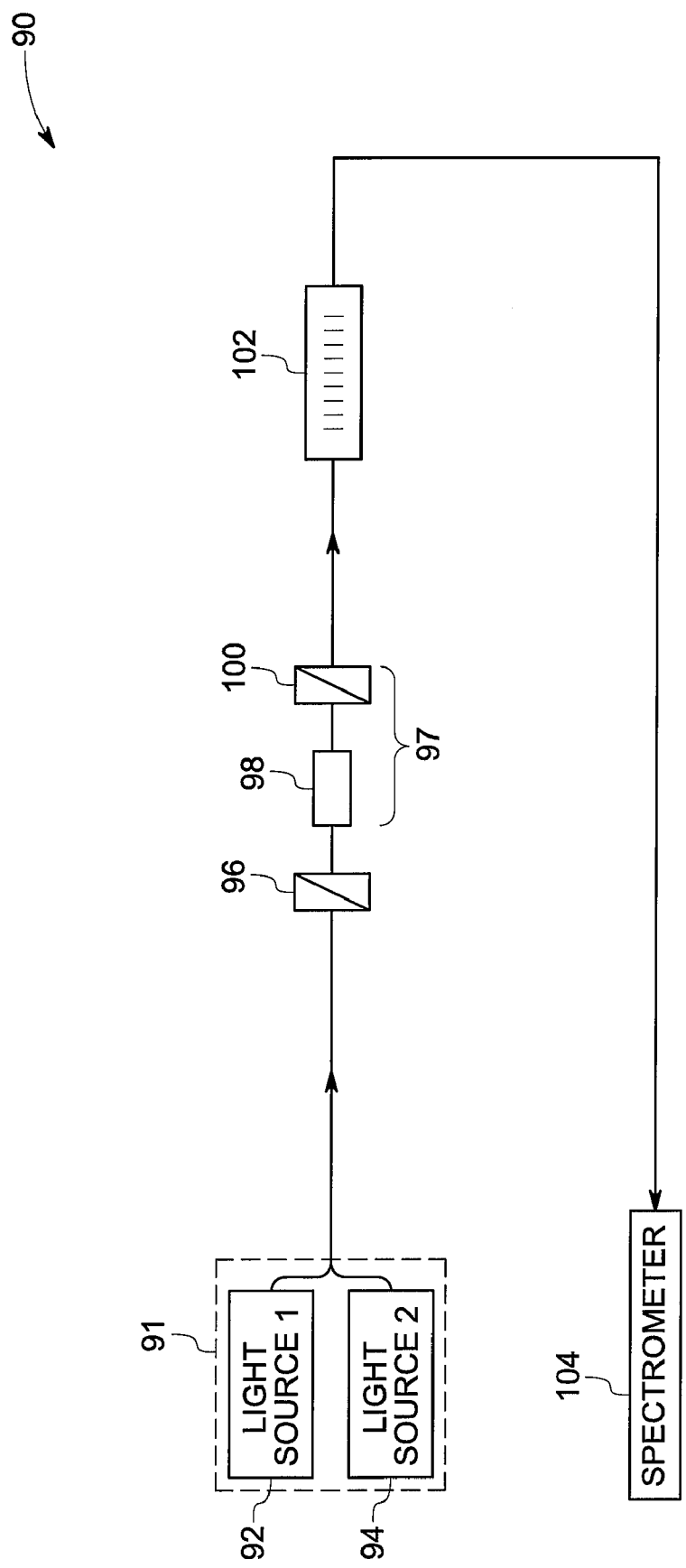
FIG. 6 is a schematic representation of an integrated measurement system in another embodiment of the present invention.

In the illustrated embodiment shown in FIG. 6, an interrogation module 91 includes at least two light sources with different center wavelengths $\lambda_1$ and $\lambda_2$. The measurement system 90 includes a first light source 92 and a second light source 94. The light output from both light sources 92 and 94 is combined to form the interrogation signal. The interrogation signal is coupled onto a first polarizer 96 to linearly polarize the interrogation signal before being incident on an FFR sensor module 97 including an FFR 98 and a second polarizer 100. A polarization rotated (PR) signal corresponding to a sensed magnetic field emerges from the FFR sensor 98 and is incident on the second polarizer 100. The component of the PR signal along the polarization angle of the second polarizer 100 emerges as an IM signal (at both wavelengths) and is coupled into an FBG sensor 102. The IM signal is wavelength modulated by the FBG sensor 102 corresponding to a sensed parameter such as temperature or stress, which modifies the Bragg wavelength of the FBG sensor 102 to provide an integrated system output signal, which is eventually detected by a spectrometer 104.

The spectrometer can be used to determine the parameters sensed by both the FBG and FFR sensor modules. The spectrometer measures both the wavelength shifts and the intensity at the two wavelengths of the light sources 92 and 94. The wavelength shifts are used to determine the value of the parameter sensed by the FBG sensor and the intensities are used to determine the value of the parameter sensed by the FFR sensor module. The use of light signals at different wavelengths enables the measurement or determination of the temperature effect on the Faraday rotation of the sensor 98 and consequently the temperature inside the Faraday material in the Faraday sensor. In some embodiments, single mode fibers with low losses through the range of wavelengths used is required to effectively transmit the signals from the two light sources. In one example, $\lambda_1$ is at about 1330 nm and $\lambda_2$ is at about 1500 nm.

Figure 7:
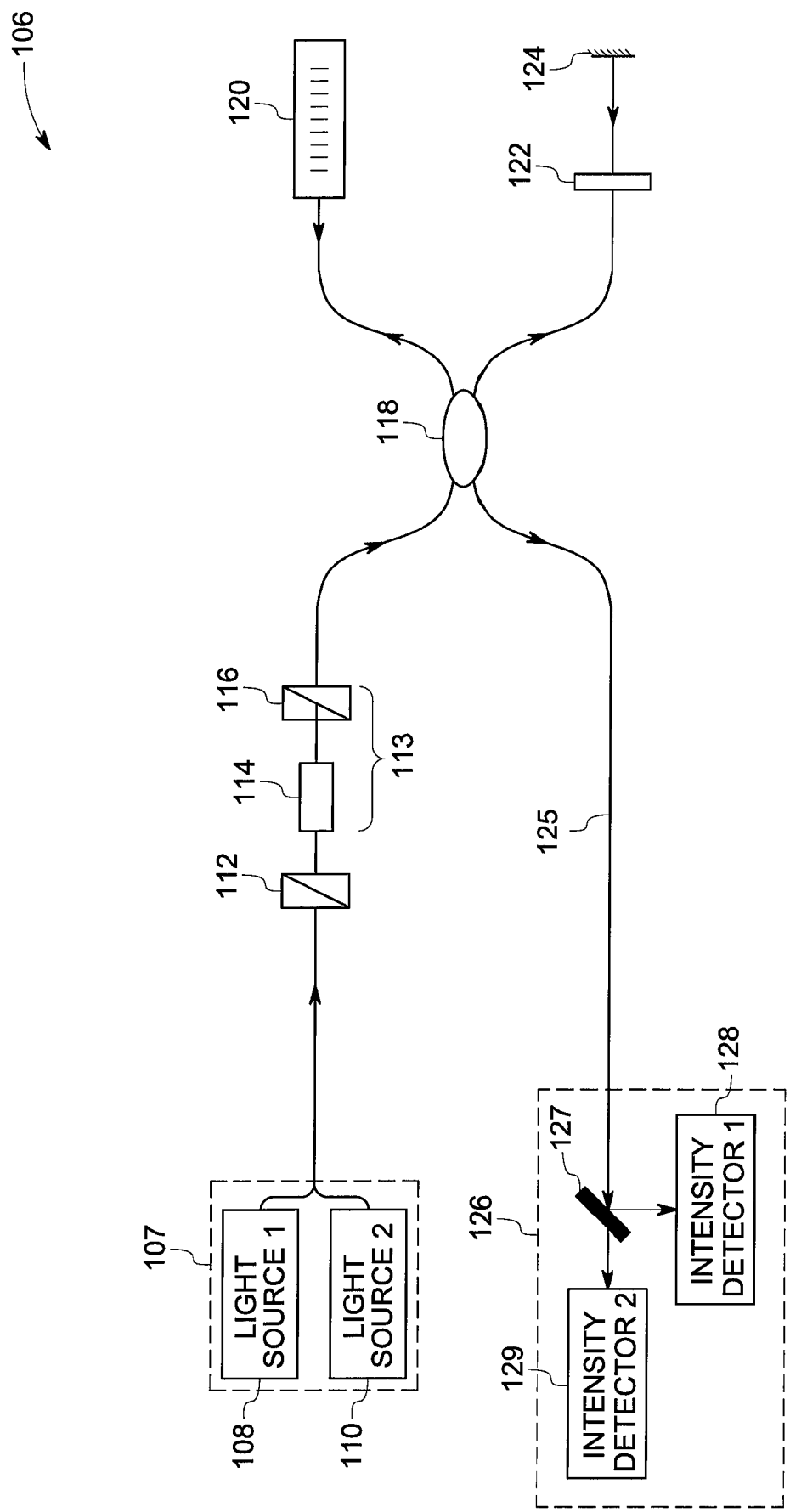
FIG. 7 is a schematic representation of an integrated measurement system in another embodiment of the present invention.

FIG. 7 illustrates another embodiment where at least two light sources with different center wavelengths $\lambda_1$ and $\lambda_2$ are used. The measurement system 106 includes light source-1 108 and light source-2 110. The light output from both light sources 108 and 110 are combined to form the interrogation signal. In this embodiment, for the final detection and analysis of the parameters, only that part of the integrated system output signal centered at $\lambda_1$ is used for determining the parameter sensed by the FFR sensor module and only that part of the integrated system output signal centered at $\lambda_2$ is used to interrogate the FBG sensor. The interrogation signal is coupled onto a first polarizer 112 to linearly polarize the interrogation signal before being incident on an FFR sensor module 113 including an FFR 114 and a second polarizer 116. A polarization rotated (PR) signal corresponding to a sensed magnetic field emerges from the FFR 114 and is incident on the second polarizer 116. The component of the PR signal along the polarization angle of the second polarizer 116 emerges as an intensity modulated (IM) signal (at both wavelengths) and through a coupler 118 and is partly coupled into an FBG sensor 120. Optionally a depolarizer can be installed between the second polarizer 116 and the coupler 118. Only that part of the IM signal centered at about $\lambda_2$ is modulated and reflected by the FBG sensor 120 corresponding to a sensed parameter such as temperature or stress, which modifies the Bragg wavelength of the sensor 120. A second part of the IM signal is also reflected off a mirror 124 after filtering through a filter 122 the signal centered at about $\lambda_2$. That is, the component of the signal at $\lambda_2$ is filtered out before being incident on the mirror 124. The reflected signal from the FBG sensor 120 (which is characteristic of the parameter measured by the FBG) and the reflected signal from the mirror 124 (which is characteristic of the FFR sensed parameter) are combined at the coupler 118, before being transmitted to a detection system 126 through fiber 125 and detected by the detection system 126. The detection system 126 includes a wavelength division multiplexer 127 to separate the two wavelengths and detectors 128 and 129 to separately detect signals centered at about the two wavelengths. In one embodiment, the detection is hardware based without any use of software detection systems.

Figure 8:
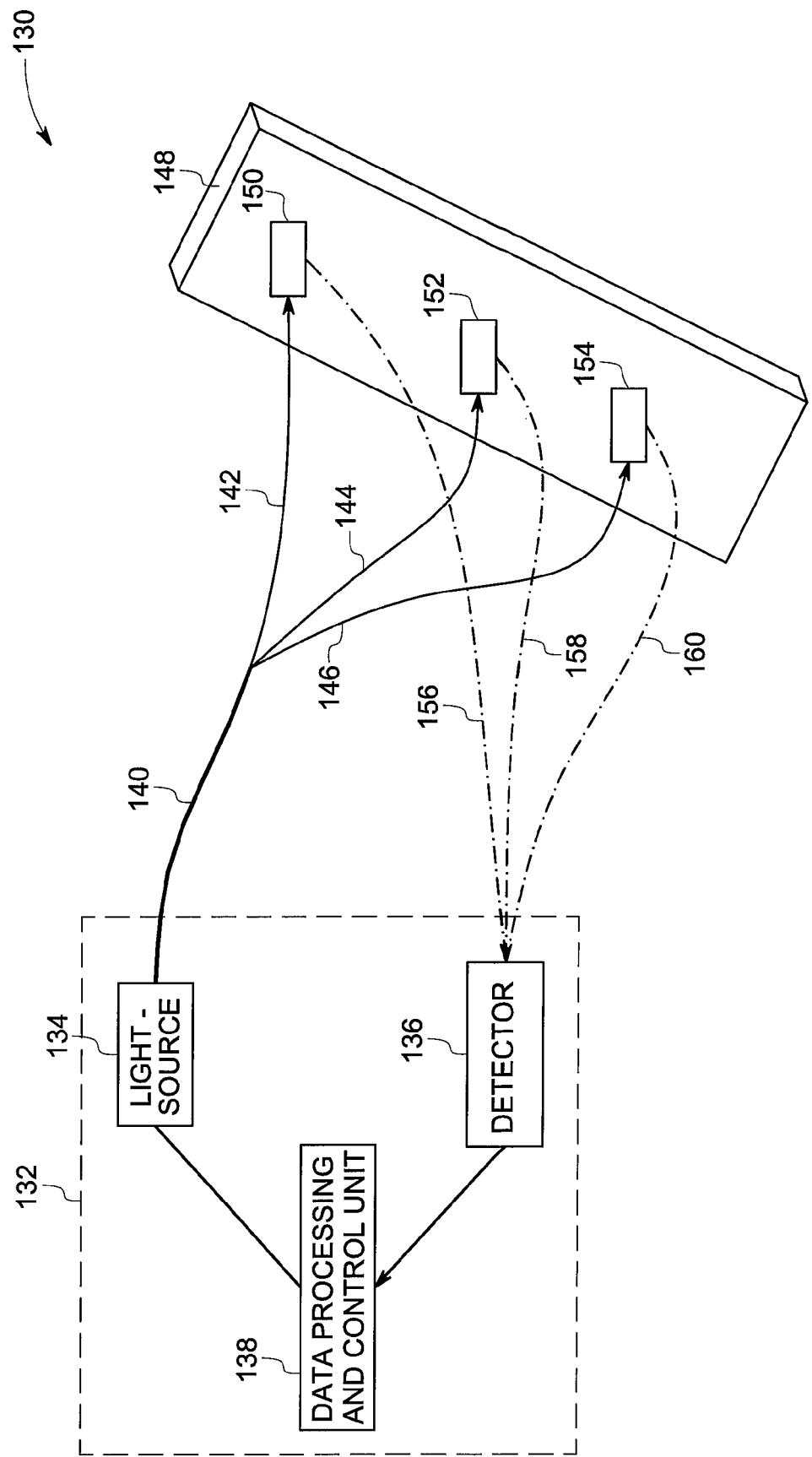
FIG. 8 is a schematic representation of a system including an integrated measurement system in one embodiment of the present invention.

FIG. 8 illustrates a system 130 including a measurement system for measuring a plurality of parameters, in one embodiment of the present invention. The measurement system includes an interrogation and analysis module 132 including at least one light source 134, a detector 136 and a data processing and control unit 138. The light from the light source is transmitted through fibers 140, 142, 144, 146 to integrated sensor modules 150, 152 and 154, which are operably coupled to a substrate or a system part 148 to measure the plurality of parameters. The integrated sensor modules may be disposed on or near or embedded into the substrate 148 of the system such as a blade of a wind turbine system. In the illustrated embodiment, the plurality of integrated sensor modules 150, 152 and 154 are used to measure parameters of interest at different points in the system. In one embodiment, each of the integrated sensor modules includes at least one FBG sensor and at least one FFR sensor module. Upon interrogation by an interrogation signal, the sensor modules generate integrated system output signals encoding parameter information from both the FBG sensor and FFR sensor module, which are transmitted to a detector 136 by fibers 156, 158, and 160. In one embodiment, the detector includes one or more intensity detectors and/or spectrum analyzers. In one example, the intensity detectors are optical to electrical (O/E) converters. Alternatively, light source and detection embodiments such as those described above with respect to FIGS. 1-7 may also be used.

Another embodiment of the present invention is a wind turbine system. The wind turbine system includes a wind turbine comprising one or more turbine blades, and an integrated measurement system comprising one or more integrated sensor module operably coupled to the one or more turbine blades to measure a plurality of parameters, wherein the integrated sensor module comprises at least one FBG sensor and at least one FFR sensor module, wherein the plurality of parameters comprise at least one FBG parameter sensed by the at least one FBG sensor and at least one FFR parameter sensed by the FFR sensor module, wherein the integrated measurement system generates an integrated system output signal corresponding to at least the one FBG parameter and the at least one FFR parameter. In one embodiment, the integrated measurement system includes a plurality of integrated sensor modules.

For wind turbine blade monitoring, it is useful to obtain information about the mechanical stresses. With the use of an integrated measurement system, information about mechanical stress experienced by the wind turbine blade and the magnetic field generated by a current in a conductor generated due a lighting strike can readily be ascertained. Additionally, if desired, the temperature may be monitored and the effect of temperature on the magnetic field sensor may be compensated. The Verdet constant is temperature dependent. The change in the Verdet constant can be estimated by measuring the response of the FFR as the temperature is varied. Such techniques to measure the effect of the temperature on a FFR sensor have been described in many references, such as "Leung et al., IEE international conference on advances in power system control, operation and management, November 1991, pp 637-643". The system provides the additional advantage of reduced the number of fibers and hardware instrumentation.

Figure 9:
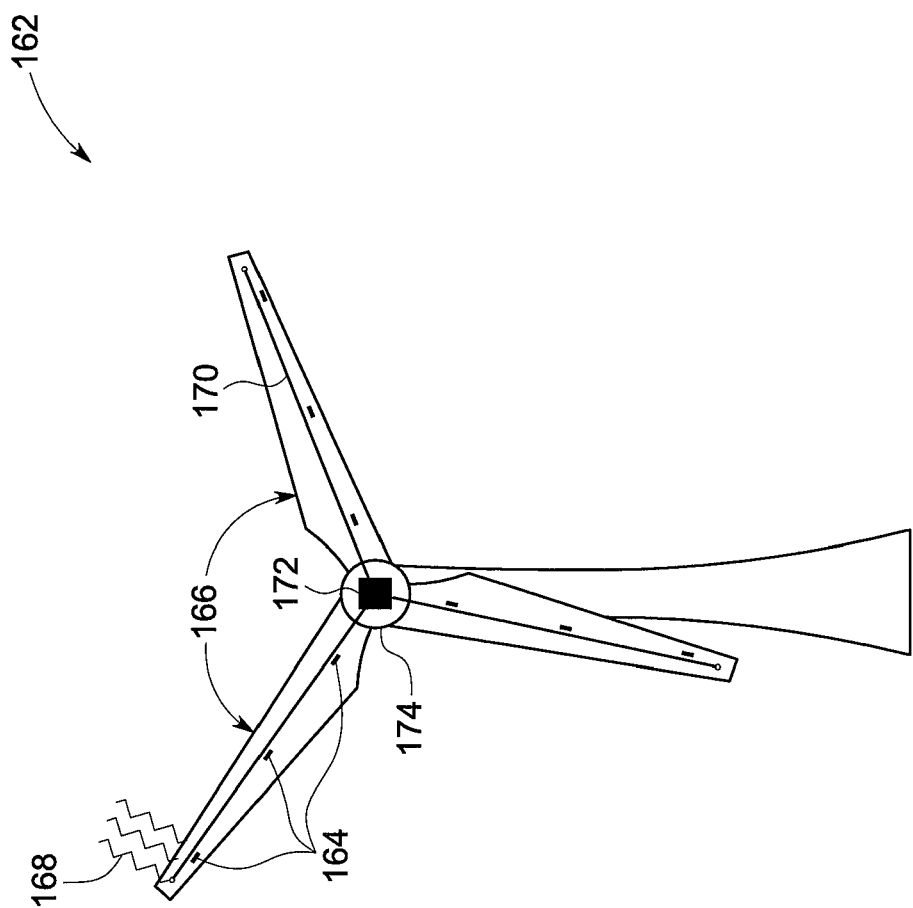
FIG. 9 is a schematic representation of a wind turbine system including an integrated measurement system in one embodiment of the present invention.

FIG. 9 is a diagrammatic illustration of a wind turbine system 162 including an integrated measurement system in accordance with one embodiment of the present invention. The integrated measurement system is used to measure parameters including stress and lighting parameters. It is generally assumed that risk of lightning strikes to an object increases with square of height of the object. In case of wind turbines where the height is typically around 110 m, there is a higher risk of lightning strikes involved. The wind turbine system 162 as shown in FIG. 8 includes a series of integrated sensor modules 164 disposed on each of wind turbine blades 166. The integrated sensor modules 164 are disposed at a certain distance from each other to measure impact points on the blade 166. When a lightning 168 strikes the blade 166, lightning current passes through a conductor 170 in the blade 166 that transmits lightning induced current to the integrated sensor modules 164. In one example, the conductor 170 may be an aluminum wire. In one embodiment, an interrogation module 172 including at least one light source is disposed in an electromagnetically isolated enclosure at the center 174 of the wind turbine system 162, which generates an interrogation signal to interrogate the integrated sensor modules 164.

The integrated sensor modules 164 are disposed at an optimal distance from each other in order to achieve a desired resolution for determining impact point on the wind turbine blade 166. In an exemplary embodiment, the integrated sensor modules 164 may be disposed at around 10 meters from each other.

The integrated system output signal generated by the integrated sensor modules may be further processed by a data processing unit (not shown) to determine not only the lighting parameters but also the stress and/or temperature at a point of measurement in the blade.

The integrated measurement system is particularly advantageous in embodiments where EMI stability is required and stress/temperature and current/magnetic field measurements are used, such as in transportation systems and in explosive environments. In one example, the transportation system is a ship. Other non-limiting examples of systems, which could beneficially include such integrated measurement systems include, power transmission lines and networks, power generators, aircrafts, railway locomotives and heavy-duty engines.

In one embodiment of the present invention, a method for integrated measurement of a plurality of parameters includes interrogating at least one integrated sensor module using an interrogation signal. The method includes sensing at least one FBG parameter and at least one FFR parameter sensing to generate an integrated system output signal. The FBG sensor is interrogated using an FBG input signal and the FFR sensor module is interrogated using an FFR input signal. In one example, an FBG output signal may provide an FFR input signal or vice versa. In one embodiment, the integrated system output signal is an intensity-modulated wavelength-modulated (IMWM) signal encoding both FBG parameter information and FFR parameter information. In one embodiment, the FBG parameter information is encoded as a wavelength modulation and the FFR parameter information signal is encoded as an intensity modulation. The IMWM signal is detected and is used to generate an FBG parameter data and an FFR parameter data.

In one example, such as for lightning localization measurement, the data from the FBG sensor and FFR sensor modules can be fused. In one embodiment, where a FBG sensor is use in a transmission mode, spectral lines will be filtered out of the broadband FBG input signal. The filtered spectral lines will change the intensity depending on their position in the spectrum. In embodiments, where the FBG output or at least a part of the FBG output signal is used as the FFR input signal, the information about the filtered spectral lines of the broadband spectrum registered by the detector can be used to estimate the intensity passed trough the FFR sensor.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An integrated measurement system for measuring a plurality of parameters comprising:

a fiber Bragg grating (FBG) sensor configured for modulating a wavelength of an FBG input signal to provide an FBG output signal corresponding to an FBG parameter;

a fiber Faraday rotator (FFR) sensor module configured for rotating a polarization and modulating an intensity of an FFR input signal to provide an FFR output signal corresponding to an FFR parameter, wherein the FBG sensor and FFR sensor module are coupled to provide an integrated system output signal; and a detection system configured for receiving the integrated system output signal and for using the integrated system output signal to obtain values associated with at least one FBG or FFR parameter.

2. The integrated measurement system of claim 1, wherein the detection system is configured for receiving the integrated system output signal and for using the integrated system output signal to obtain values associated with both the FBG and FFR parameters.

3. The integrated measurement system of claim 1, wherein the detection system is configured to further receive a reflected FBG output signal to obtain values associated the FBG parameter.

4. The integrated measurement system of claim 1, wherein the FFR sensor module comprises an FFR and a polarizer.

5. The integrated measurement system of claim 1, wherein the FBG parameter is stress or temperature.

6. The integrated measurement system of claim 1, wherein the FFR parameter is magnetic field or electric current.

7. The integrated measurement system of claim 1, further comprising an interrogation module comprising at least one light source to provide an interrogation signal.

8. The integrated measurement system of claim 1, further comprising an interrogation module comprising a first light source emitting light centered at about a first wavelength and a second light source emitting light centered at about a second wavelength, wherein light centered at the first wavelength is designed to interrogate the FBG sensor and light at the second wavelength is designed to interrogate the FFR sensor module.

9. The integrated measurement system of claim 1, wherein the detection system comprises a spectrometer to determine a modulated wavelength of at least a part of the integrated system output signal to provide an FBG parameter data.

10. The integrated measurement system of claim 1, wherein the detection system comprises an intensity detector for measuring an intensity of at least a part of the integrated system output signal to provide an FFR parameter data.

11. The integrated measurement system of claim 1, wherein the FBG sensor and the FFR sensor module are operably coupled in a single fiber loop.

12. The integrated measurement system of claim 1, further comprising a depolarizer to depolarize an FBG or FFR input signal.

13. The integrated measurement system of claim 1, further comprising a data processing and control, wherein the data processing and control unit processes an FBG parameter data generated by a spectrometer to determine an FBG parameter, an FFR parameter data generated by an intensity detector to determine an FFR parameter, or both.

14. The integrated measurement system of claim 1, wherein the FFR sensor module comprises a fiber optic crystal.

15. The integrated measurement system of claim 1, wherein the FFR sensor module comprises a fiber optic coil.

16. The integrated measurement system of claim 1, wherein the FFR sensor module is configured to measure magnetic fields up to about +/−4 T.

17. The integrated measurement system of claim 1, wherein the data processing and control unit is configured to have an interrogation rate of at least about 2 MHz.

18. The integrated measurement system of claim 1, wherein the FBG sensor comprises a fiber Bragg grating array.

19. A system comprising:
a substrate; and
an integrated measurement system comprising at least one integrated sensor module operably coupled to the substrate to measure a plurality of parameters, wherein the sensor module comprises at least one FBG sensor and at least one FFR sensor module, wherein the plurality of parameters comprise at least one FBG parameter sensed by the at least one FBG sensor and at least one FFR parameter sensed by the FFR sensor module;
wherein the integrated measurement system generates an integrated system output signal corresponding to both at least the one FBG parameter and the at least one FFR parameter.

20. The system of claim 19, wherein the integrated system output signal comprises an intensity-modulated wavelength-modulated signal.

21. The system of claim 19, wherein the integrated measurement system further comprising an interrogation and analysis module.

22. The system of claim 19, comprising a wind turbine system, wherein the substrate comprises a turbine blade of the wind turbine system.

23. The system of claim 19, comprising a transportation system, wherein the substrate comprises a part of a transportation system.

24. A wind turbine system comprising:
a wind turbine comprising one or more turbine blades; and
an integrated measurement system comprising one or more integrated sensor modules operably coupled to the one or more turbine blades to measure a plurality of parameters, wherein the integrated sensor module comprises at least one FBG sensor and at least one FFR sensor module, wherein the plurality of parameters comprise at least one FBG parameter sensed by the at least one FBG sensor and at least one FFR parameter sensed by the FFR sensor module module;
wherein the integrated measurement system generates an integrated system output signal corresponding to at least the one FBG parameter and the at least one FFR parameter.

25. The system of claim 24, wherein the at least one FBG parameter is stress or temperature.

26. The system of claim 24, wherein the at least one FFR parameter is a lightning parameter.

27. The system of claim 24, further comprising a conductor configured to receive a lightning strike and transmit a lightning induced current to the integrated measurement system.

28. A method for integrated measurement of a plurality of parameters comprising:
interrogating at least one integrated sensor module using an interrogation wherein the integrated sensor module comprises at least one FBG sensor for sensing at least FBG parameter and at least one FFR sensor module for sensing at least one FFR parameter, wherein the FBG sensor is interrogated using an FBG input signal and the FFR sensor module is interrogated using an FFR input signal;

generating an integrated system output signal associated with both the FBG parameter and FFR parameter;

detecting the integrated system output signal to generate a FBG parameter data and FFR parameter data; and determining a value of the FBG parameter and the FFR parameter.

29. The method of claim 28, wherein the FBG parameter is stress or temperature.

30. The method of claim 28, wherein the FFR parameter is a lightning parameter.

31. The method of claim 28, further comprising estimating an intensity of the FFR input signal by measuring an FBG output in a transmission mode, and determining filtered FBG output wavelengths.

* * * * *